April 12, 1927.
M. L. MARTUS ET AL
1,624,795
BATTERY HOLDING AND CARRYING MEANS
Filed Dec. 19, 1923      2 Sheets-Sheet 1
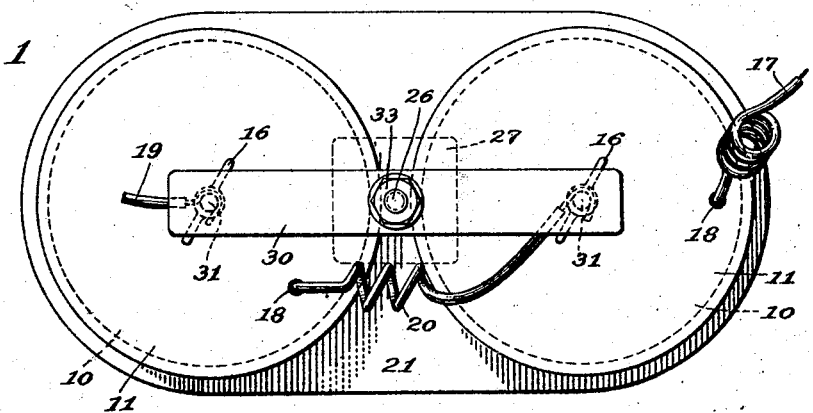
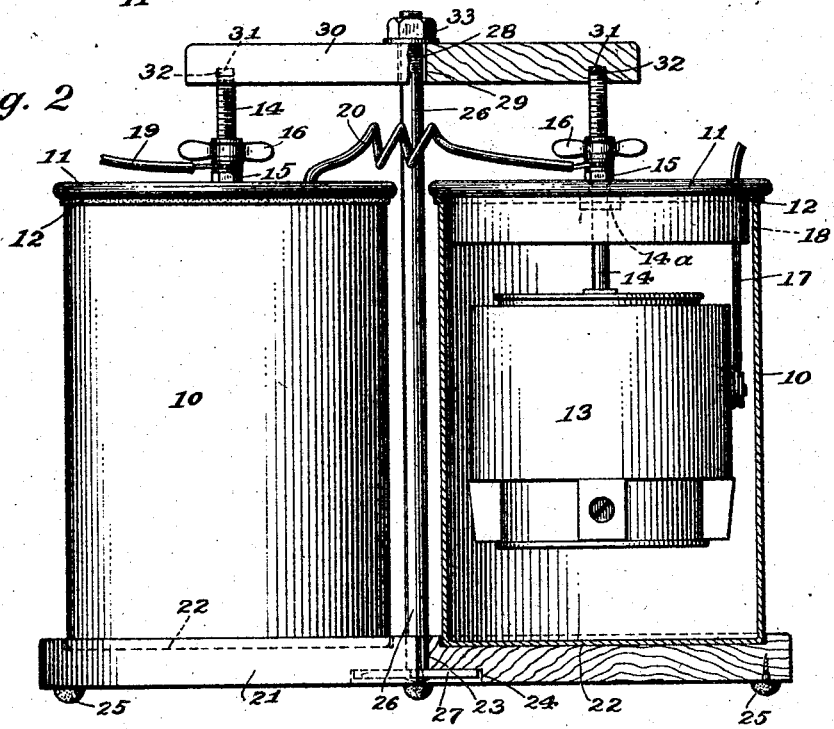
INVENTORS
Martin L. Martus,
Edmund H. Becker and
James G. Ross
BY
Chamberlain & Newman
ATTORNEYS April 12, 1927.

M. L. MARTUS ET AL 1,624,795

BATTERY HOLDING AND CARRYING MEANS

Filed Dec. 19, 1923

INVENTORS
Martin L. Martus,
Edmund H. Becker and
James G. Ross
BY
Chamberlain & Newman
ATTORNEYS Patented Apr. 12, 1927.

1,624,795

UNITED STATES PATENT OFFICE.

MARTIN L. MARTUS, OF WOODBURY, AND EDMUND H. BECKER AND JAMES G. ROSS, OF WATERBURY, CONNECTICUT.

BATTERY HOLDING AND CARRYING MEANS.

Application filed December 19, 1923. Serial No. 681,480.

The present invention relates to a stand and carrier for primary batteries, and particularly for use with a plurality of jar battery units of the copper alkaline solution type, although the same may be used with other types, as will be understood. An object of the invention is to provide a device by means of which the batteries may be securely mounted to rigidly support them, and tightly connect their parts, and which at the same time will enable them to be easily moved or carried about.

A further object is to provide a carrier which will retain the jar covers tightly in place to prevent looseness, and to provide protection against spilling the solution.

Other objects are simplicity of construction, facility of assembly, and adjustability.

With the above and other objects in view, embodiments of our invention are shown in the accompanying drawings, and these embodiments will be hereinafter more fully described, and the invention will be finally pointed out in the claims.

In the drawings:

Fig. 1 is a plan view of a stand and carrier device, according to one embodiment of the invention, adapted to support two battery units of the cylindrical jar type;

Fig. 2 is a view of the same, partially in side elevation, and partially in vertical section;

Figs. 3 and 4 are plan views of modified forms, adapted to support four battery units;

Similar reference characters indicate corresponding parts throughout the several figures of the drawings.

Figure 5:
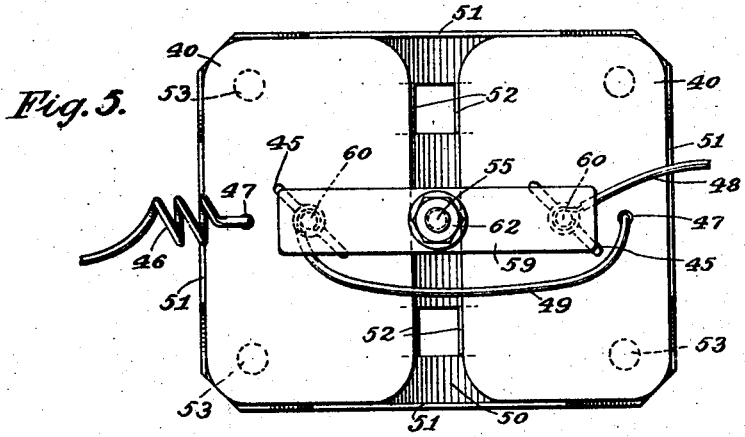
Fig. 5 is a plan view of a further modification, adapted to support two battery units of the plate element rectangular jar type.

Referring to the drawings, and more particularly to Figs. 1 and 2 thereof, the device shown therein is adapted for use with a pair of jar batteries of the cylindrical type, each comprising a cylindrical jar container 10, formed of enamel covered metal, or other suitable material, and provided with a centrally apertured cover 11 having a rubber gasket 12 interposed between its flange and the upper edge of the container. A cylindrical battery element 13 is suspended within the container by means of a central upwardly extending threaded rod 14 engaged through the central aperture of the cover, having a flange 14ª engaging the under surface of the cover, and provided with nuts 15 and 16 engaged upon the upper side of the cover, the latter nut being winged.

A negative lead 17 is connected to the battery element 13 of one of the batteries and extends through a hole 18 in the cover, while positive lead 19 is secured to the rod 14 of the other battery between the nuts 15 and 16, and the two batteries are connected in series by a lead 20 extending from the rod 14 of the first battery through the hole 18 of the second, and connected to the battery element 13 thereof.

The stand and carrying device comprises a base 21 preferably of wood, provided at its upper surface with a pair of spaced circular recesses 22, in which the bases of the jars are seated, and provided centrally between the recesses with an aperture 23, and a rectangular recess 24 surrounding the aperture at the under side. A plurality of cushion feet 25, of rubber or the like are secured to the under side of the base.

A vertical connector rod 26 is engaged in the central aperture 23, being provided at its lower end with a rectangular flange 27 riveted thereto, and engaged in the recess 24 to prevent turning, and having at its upper end a threaded portion 28 engaged through the central aperture 29 of a cross piece or handle member 30. The member 30 is provided at its under side and at each end with pockets 31, having rubber inserts 32 therein, and in which are engaged the upper ends of the rods 14 of the batteries, the member being tightened down by means of a nut 33 screwed upon the upper end of the rod 26 and engaging the member at its upper side. It is obvious that by tightening down the nut 33 the jars are clamped in place between the base 21 and the cross piece or handle member, and at the same time the covers are securely held down upon the jars rigidly positioning the battery elements 13. The two battery units are thus supported and connected, and may be conveniently carried without displacing any of the parts or spilling the solution.

In Figs. 3 and 4 there are illustrated modified forms of the device adapted for supporting and carrying four cylindrical battery jars, the base 34 being square, rounded at the corners, and provided with four circular recesses 35 for seating the jars, while the upper member or handle is in the form of an X 36, Fig. 3, and an H 36ª, Fig. 4, engaged at its ends with the rods 14 of the batteries by the center rod 37, and nut 38 connecting the same to the base.

Figure 6:
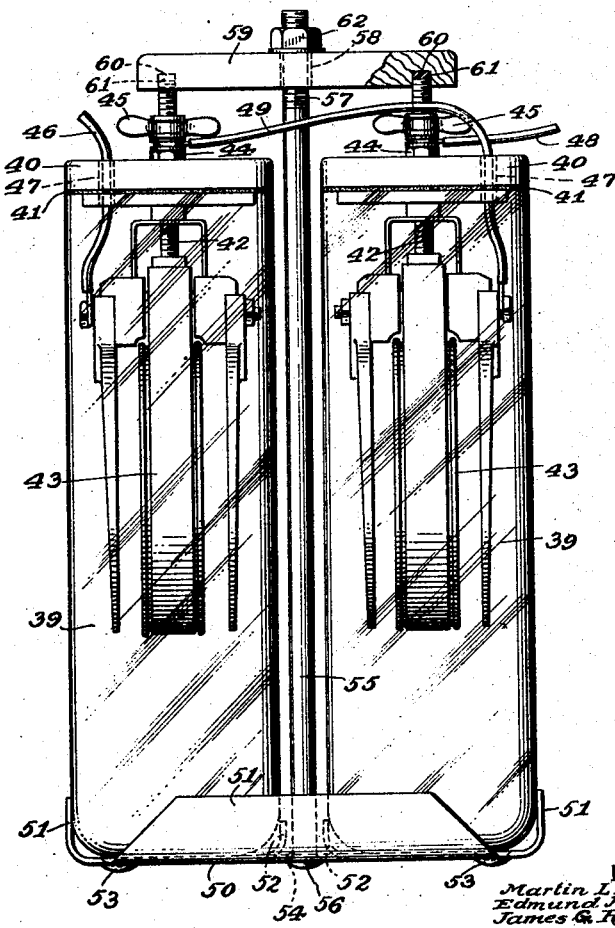
Fig. 6 is a side elevation of the same.

The modification illustrated in Figs. 5 and 6 is adapted for batteries of the plate type having substantially rectangular jars of glass, or the like. The jars 39 are provided with a centrally apertured flanged cover 40 seated upon a rubber gasket 41 at the upper edge of the jar, and having a threaded center rod 42 engaged in the aperture, upon which the plate type battery element 43 is suspended within the jar. The rod is fixed in position by nuts 44 and 45 at the upper side of the cover, and serve as binding means for the lead wires. The negative lead 46 is connected to the battery element 43 of one of the batteries and extends through a hole 47 in the cover, while positive lead 48 is secured to the rod 42 of the other battery between the nuts 44 and 45, and the two batteries are connected in series by a lead 49 extending from the rod 42 of the first battery through the hole 47 of the second, and connected to the battery element 43 thereof.

The support and carrier for the jars consists of a base member 50, formed of sheet metal, provided at its four sides with upturned flanges 51 engaging the sides of the jars, and provided interiorly with spaced lugs 52 struck up to engage the inner sides of the jars near each end to thereby securely seat them against movement, and maintain them in spaced relation to each other. Rounded bosses 53 are pressed downwardly at the corners of the base to form supporting feet, and at the center, and between the jars, an aperture 54 is provided, through which the vertical connector rod 55 is engaged. A head 56 is formed at the lower end of the rod which engages the lower surface of the base, and at its upper end it is threaded, as at 57, and engaged in the central aperture 58 of the upper or handle member 59. This handle member is similar to that shown in Figs. 1 and 2, being provided at its ends with sockets 60, having rubber inserts 61, and held in engagement with the ends of the rods 42 by a nut 62 screwed upon the rod 55. The batteries are thus tightly clamped between the base and handle members, the jar covers being securely held upon the upper edges of the jars, and the parts of the batteries rigidly supported.

We have illustrated and described preferred and satisfactory embodiments of the invention, but it will be obvious that changes may be made therein, within the spirit and scope thereof, as defined in the appended claims.

Having thus described our invention, what we claim and desire to secure by Letters Patent is:

1. In combination with a plurality of battery units a supporting device therefor comprising a base member adapted to seat the batteries, an upper member extending between the batteries and engaging their upper ends at its ends whereby its center portion forms a handle, and connecting means between said base member and upper member adapted to clampingly engage the same with the batteries.

2. In combination with a plurality of battery units each including a jar and a removable cover having a central upwardly extending post, a supporting device therefor comprising a base member having seating portions adapted to position and space said battery units, a centrally apertured upper member provided at its ends with sockets adapted to be engaged with said posts of the covers, and a connecting rod secured at its lower end to said base member and having its upper end threaded and extended through said aperture of the upper member, and a nut screwed upon said threaded end engaging said upper member at its upper side to clampingly engage the batteries between said members, said upwardly extending posts spacing the upper member above the covers whereby a handle is formed.

Signed at Waterbury, in the county of New Haven and State of Connecticut, this 17th day of December A. D., 1923.

MARTIN L. MARTUS
EDMUND H. BECKER
JAMES G. ROSS.